US008400953B1

(12) United States Patent
Gunasekara et al.

(10) Patent No.: US 8,400,953 B1
(45) Date of Patent: Mar. 19, 2013

(54) SYSTEMS AND METHODS OF CALL SETUP

(75) Inventors: Don Gunasekara, Reston, VA (US); Peter R. Langlois, Leesburg, VA (US)

(73) Assignee: Nextel Communications Inc., Reston, VA (US)

( * ) Notice: Subject to any disclaimer, the term of this patent is extended or adjusted under 35 U.S.C. 154(b) by 1410 days.

(21) Appl. No.: 11/751,287

(22) Filed: May 21, 2007

(51) Int. Cl.
H04L 5/16 (2006.01)

(52) U.S. Cl. .......................................... 370/296

(58) Field of Classification Search ................ 370/296, 370/236, 261, 260, 262, 263, 270, 913
See application file for complete search history.

(56) References Cited

U.S. PATENT DOCUMENTS

| | | | |
|---|---|---|---|
| 6,061,728 A * | 5/2000 | Mead et al. | 709/227 |
| 6,487,180 B1 | 11/2002 | Borgstahl et al. | |
| 6,892,083 B2 * | 5/2005 | Shostak | 455/575.6 |
| 6,901,255 B2 | 5/2005 | Shostak | |
| 6,947,411 B2 | 9/2005 | Parker et al. | |
| 7,493,124 B2 * | 2/2009 | Hirsbrunner et al. | 455/456.1 |
| 7,643,817 B2 * | 1/2010 | Klug et al. | 455/411 |
| 7,751,348 B2 * | 7/2010 | Shaffer et al. | 370/260 |
| 2001/0031071 A1 | 10/2001 | Nichols et al. | |
| 2002/0029157 A1 | 3/2002 | Marchosky | |
| 2002/0085701 A1 * | 7/2002 | Parsons et al. | 379/211.01 |
| 2003/0065626 A1 | 4/2003 | Allen | |
| 2003/0140928 A1 | 7/2003 | Bui et al. | |
| 2004/0190468 A1 * | 9/2004 | Saijonmaa | 370/312 |
| 2004/0205175 A1 * | 10/2004 | Kammerer | 709/223 |
| 2005/0021369 A1 | 1/2005 | Cohen et al. | |
| 2005/0021610 A1 * | 1/2005 | Bozionek et al. | 709/203 |
| 2005/0055215 A1 | 3/2005 | Klotz | |
| 2005/0113134 A1 * | 5/2005 | Bushnell et al. | 455/555 |
| 2005/0144485 A1 * | 6/2005 | Mousseau | 713/202 |
| 2006/0014556 A1 * | 1/2006 | Park et al. | 455/518 |
| 2006/0084430 A1 | 4/2006 | Ng | |
| 2006/0182259 A1 * | 8/2006 | Shaffer et al. | 379/265.02 |
| 2006/0271400 A1 | 11/2006 | Clements et al. | |
| 2007/0105579 A1 * | 5/2007 | Shaffer et al. | 455/519 |
| 2007/0124490 A1 * | 5/2007 | Kalavade et al. | 709/230 |
| 2007/0135106 A1 * | 6/2007 | Sung et al. | 455/414.1 |
| 2007/0165653 A1 * | 7/2007 | Wiatrak et al. | 370/401 |
| 2007/0280453 A1 * | 12/2007 | Kelley et al. | 379/201.01 |

FOREIGN PATENT DOCUMENTS

WO WO 2004/038630 A1 5/2004

OTHER PUBLICATIONS

Vocera Communications System, Partner Press Releases, downloaded from the Internet on Mar. 28, 2007 from http://www.vocera.com/news/SprintPartner3.aspx.
Vocera Communications System, Wearable Instant Voice Communication, downloaded from the Internet on Mar. 28, 2007 from http://www.vocera.com.

* cited by examiner

*Primary Examiner* — Mark Rinehart
*Assistant Examiner* — Maharishi Khirodhar

(57) ABSTRACT

Systems and methods of call setup and information delivery are provided. Calls can be setup between communication units supported by a local area network and those supported by a wide area network using presence information of either or both of the wide area and local area networks.

16 Claims, 3 Drawing Sheets

SYSTEMS AND METHODS OF CALL SETUP

BACKGROUND OF THE INVENTION

Doctors and other medical personnel have typically been early adopters of various forms of wireless communication technology such as wireless pagers and wireless telephones. In the medical and other industries Vocera Communications provides an in-building wireless local area network (LAN) voice communication network that employs communication badges worn by users. The communication badges include a button for initiating a connection to a voice communications server. The user of the communication badge can then speak a command into the badge and the voice communications server recognizes the voice command and acts upon it accordingly. For more information on the system provided by Vocera Communications the interested reader should refer to U.S. Pat. Nos. 6,892,033 and 6,901,255.

SUMMARY OF THE INVENTION

Although the system by Vocera Communications allows calls to and from the public switched telephone network (PSTN), these calls are limited to conventional circuit-switched calls. Exemplary embodiments of the present invention allow in-building wireless LAN voice communications to be conducted with push-to-talk communication units supported by a wide area network (WAN). Moreover, exemplary embodiments allow the in-building wireless LAN voice communications network to obtain presence information about push-to-talk communication units supported by a wide area network (WAN).

Other objects, advantages and novel features of the present invention will become apparent from the following detailed description of the invention when considered in conjunction with the accompanying drawings.

BRIEF DESCRIPTION OF THE DRAWING FIGURES

DETAILED DESCRIPTION OF THE PREFERRED EMBODIMENTS

Figure 1:
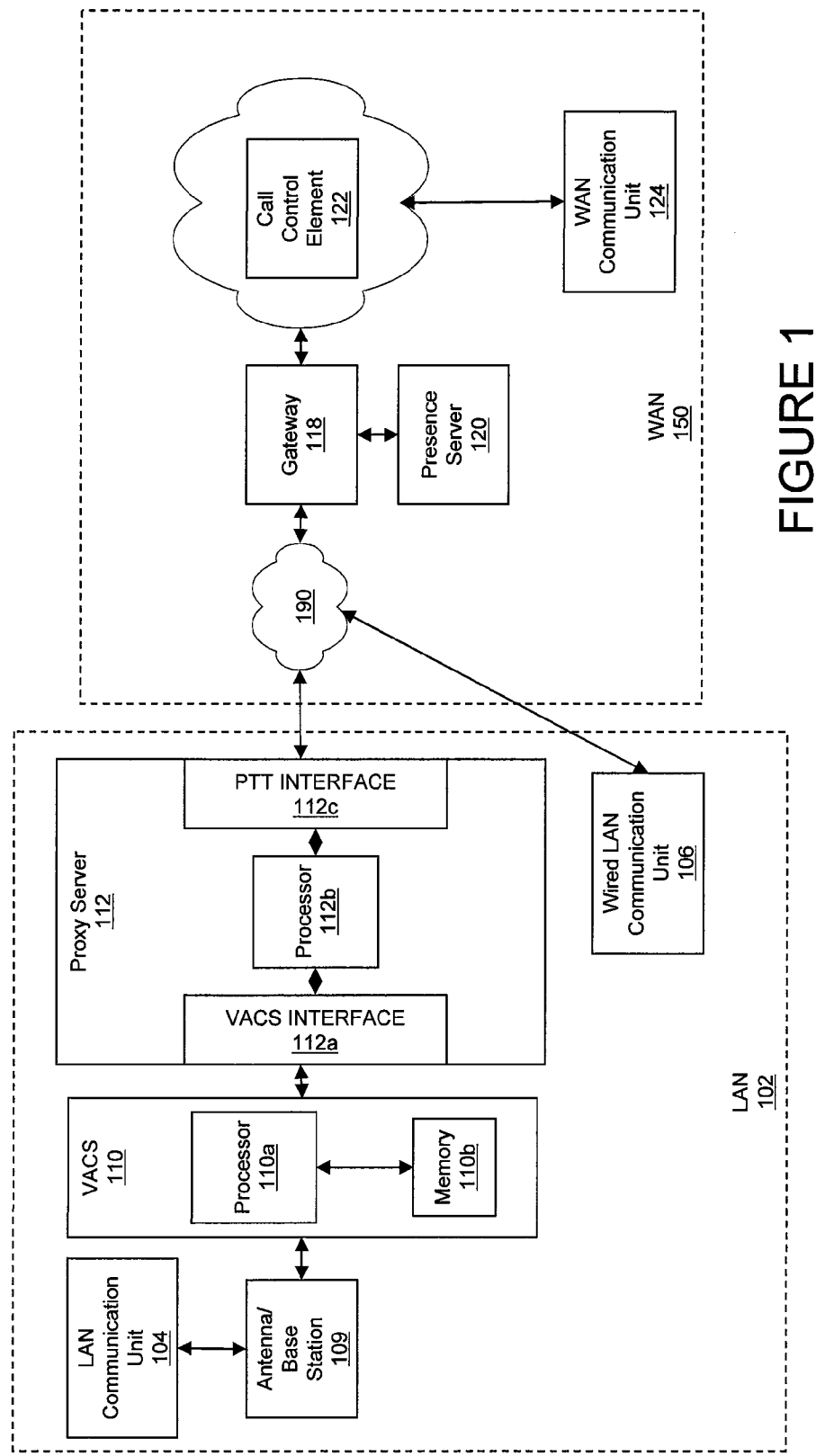
FIG. 1 is a block diagram of an exemplary system in accordance with the present invention.

FIG. 1 is a block diagram of an exemplary system in accordance with the present invention. The system of FIG. 1 allows wireless communication unit 104 and wired communication unit 106 of local area network (LAN) 102 to communicate with communication unit 124 supported by wide area network (WAN) 150. Accordingly, communication unit 104 is coupled by a wireless communication link to an antenna and/or base station 109, which in turn is coupled to a voice activated communication server (VACS) 110. VACS 110 includes processor 110a, and can include functionality of, for example, a Vocera Communication Server that runs Vocera Telephony Solution software. However, as will be described in more detail below, processor 110a includes additional functionality beyond that of the conventional Vocera Communication Server to allow calls between communication units of LAN 102 with push-to-talk communication units of WAN 150. Specifically, processor 110a includes logic for implementing this additional functionality. Processor 110a can be any type of processor, such as a microprocessor, field programmable gate array (FPGA) and/or an application specific integrated circuit (ASIC), and when processor 110a is a microprocessor then the logic can be processor-executable code loaded from memory 110b.

Wireless antenna and/or wireless base station 109 can use a wireless or wired communication link as a backhaul to VACS 110. The wireless communication link between LAN communication unit 104 and the wireless antenna and/or wireless base station 109 can be any type of wireless protocol, such as Bluetooth or 802.11. Wired LAN communication unit 106 is coupled to gateway 118 via network 190. Gateway 118 can convert voice and data from a format of WAN 150 into a format of LAN 102 (e.g., a format employed by VACS 110), and vice versa. Wired LAN communication unit 106 can be, for example, a desktop computer running a push-to-talk application or a dedicated push-to-talk console.

For push-to-talk communications between communication unit 104 and communication unit 124, VACS 110 is coupled to call control element 122 of the wide area network by way of proxy server 112, gateway 118 and network 190. Specifically, proxy server 112 includes a processor 112b coupling a VACS interface 112a to a PTT interface 112c. Gateway 118 is also coupled to presence server 120. Presence server 120 stores presence information for communication units of WAN 150 and LAN 102. Processor 112b of proxy server 112 provides a call control signaling interface between VACS 110 and gateway 118. Accordingly, processor 112b of proxy server 112 maps the call control protocol of the local area network 102 with that of WAN 150. For example, when WAN 150 employs Push-to-Talk over Cellular (PoC) communication protocol, processor 112b of proxy server 112 can convert the protocol of local area network 102 into a PoC compatible protocol. If it is desired to support additional push-to-talk protocols, such as iDEN push-to-talk, gateway 118 can be coupled to an iDEN gateway (not illustrated), and gateway 118 can convert communication protocols from the PoC compatible protocol into the iDEN protocol. Alternatively, or additionally, the PoC to iDEN protocol conversion can be performed by gateway 118.

Figure 2:
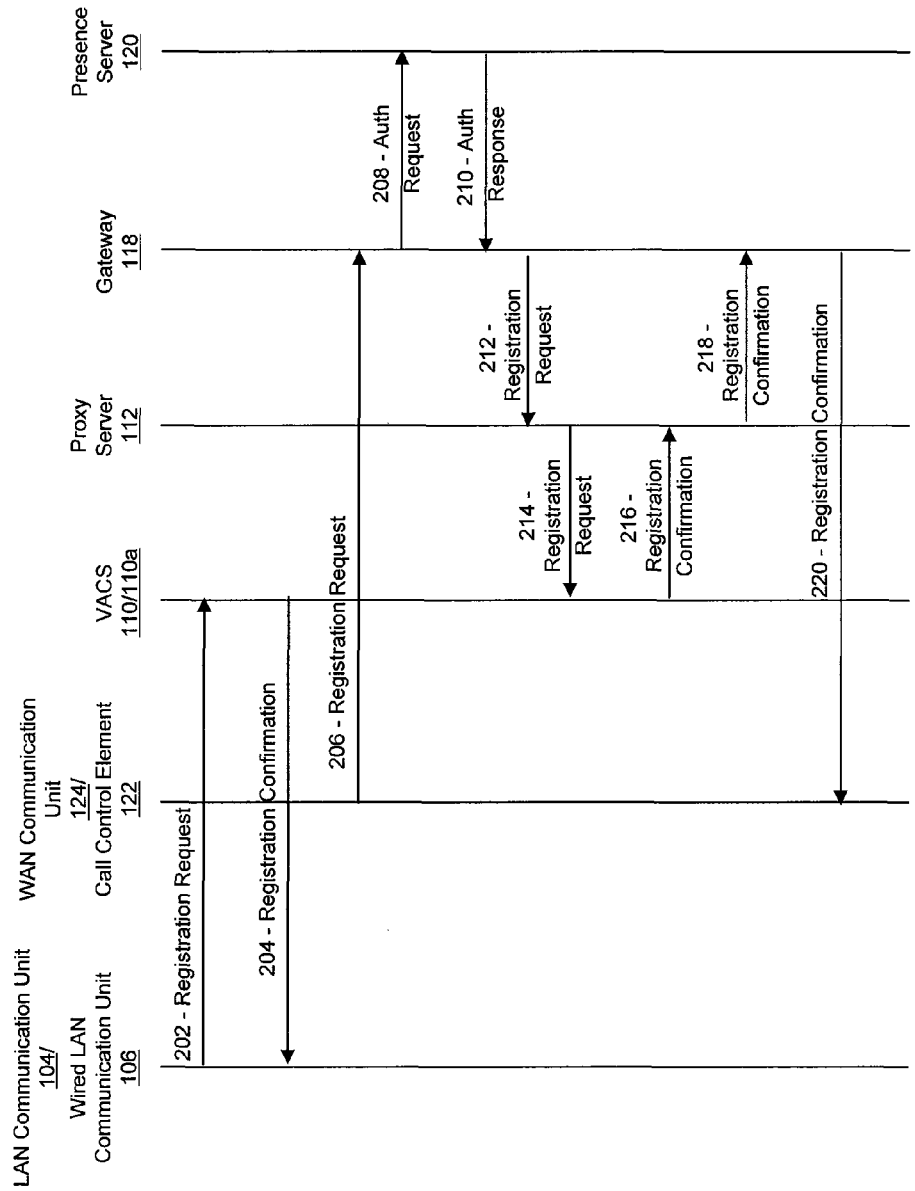
FIG. 2 is a call flow diagram of an exemplary method of registration in accordance with the present invention.

FIG. 2 is a flow diagram of an exemplary method of registration for communication units 104, 106 and 124 in accordance with the present invention. LAN communication unit 104 or wired LAN communication unit 106 registers in a conventional manner by sending a registration request to VACS 110/110a (step 202), and if processor 110a determines that the communication unit is authorized, VACS 110/110a returns a registration confirmation message (step 204).

Unlike LAN communication unit 104 or wired LAN communication unit 106, which is supported by the local area network and uses VACS 110 as its primary call control element, WAN communication unit 124 is supported by a wide area network and uses call control element 122. In order to allow WAN communication unit 124 to communicate with LAN communication unit 104 or wired LAN communication unit 106, when WAN communication unit 124 registers within the wide area network, a trigger causes communication unit 124 to send a registration request to gateway 118 via call control element 122 (step 206). This trigger can be sent across the wide area network or can be part of the processing of the communication unit itself. Alternatively, or additionally, call control element 122 or another element of the wide area network, can send the registration request to gateway 118. WAN communication unit 124 can be arranged to allow a user to publish various types of presence statuses to presence server 120.

Gateway 118 then sends an authorization request to presence server 120 (step 208), and presence server 120 responds with an authorization response (step 210). Gateway 118 then sends a registration request to proxy server 112 (step 212), and proxy server 112 sends a registration request to VACS 110/110a (step 214). Processor 110a of VACS 110 adds or updates a registration record for WAN communication unit 124 in its local database, and confirms the registration to proxy server 112 (step 216). Proxy server 112 confirms the registration request with gateway 118 (step 218). Gateway 118 then sends a registration confirmation message to WAN communication unit 124/call control element 122 (step 220). Accordingly, when VACS 110/110a receives a call request that involves WAN communication unit 124, processor 110a of VACS 110, based on the registration information in its database, can request presence information from presence server 120, and setup the call when WAN communication unit 124 is available.

It should be recognized that the particular messages described in connection with FIG. 2 are merely exemplary, and could be any type of messages. For example, these messages can be session initiation protocol (SIP) messages, such as REGISTER, PUBLISH, SUBSCRIBE and NOTIFY messages. In this case, WAN communication unit 124 can include, for example, a Java client application that supports SIP messaging.

Figure 3:
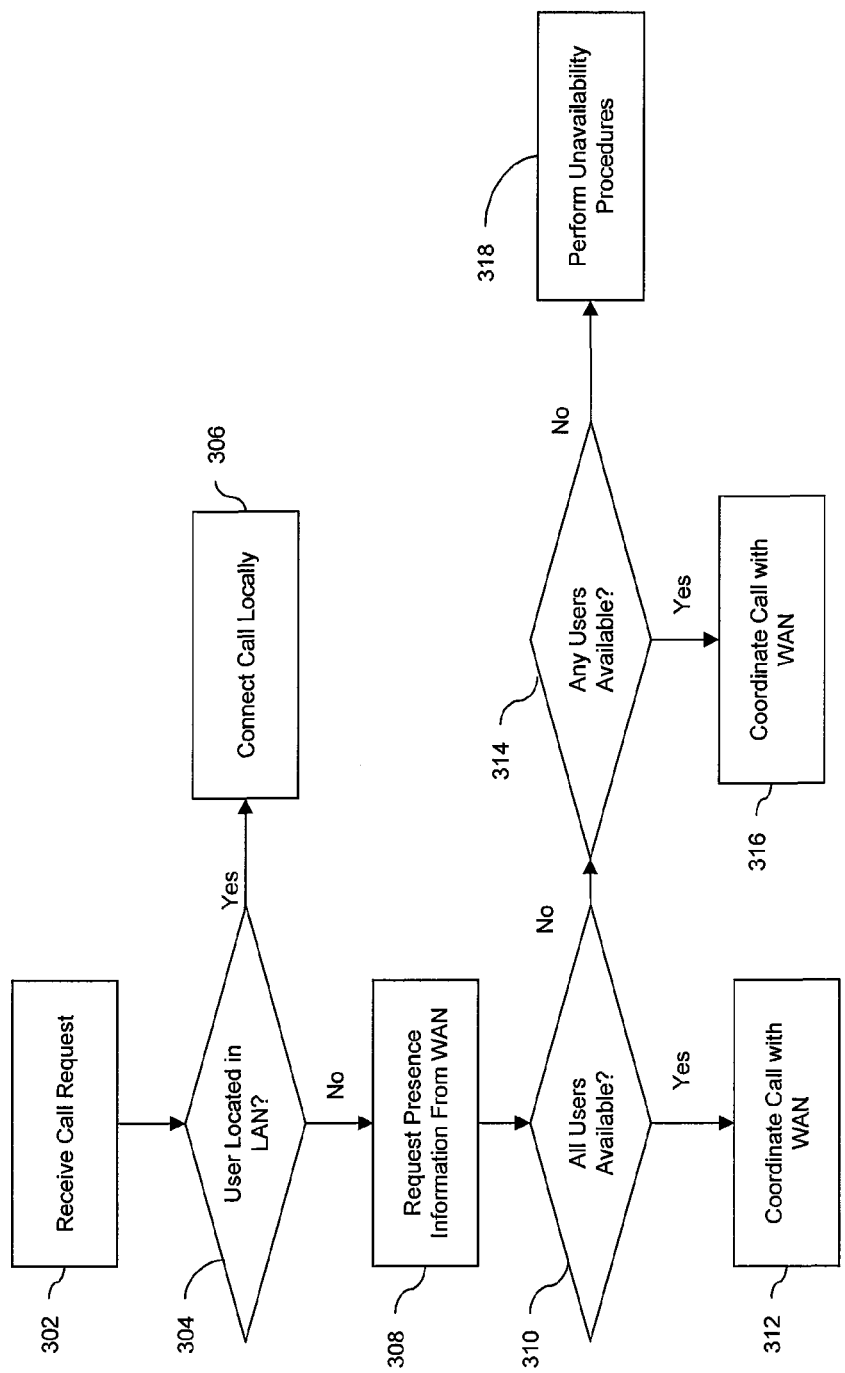
FIG. 3 is a flow diagram of an exemplary method of connecting calls between communication units supported by a local area network and a wide area network in accordance with the present invention.

FIG. 3 is a flow diagram of an exemplary method for processor 110a of VACS 110 for connecting calls between communication units supported by a local area network and a wide area network in accordance with the present invention. When VACS 110 receives a call request from LAN communication unit 104 (step 302), processor 110a of VACS 110 determines whether at least one of the call recipients is located outside of the local area network 102 (step 304). The call request can be, for example, digitized voice with an identifier of a call recipient (e.g., a person and/or a group). Processor 110a of VACS 110 can determine whether the call recipient is located in local area network 102 by referencing a database of communication units currently registered with VACS 110. When all of the call recipients are located inside of local area network 102 ("Yes" path out of decision step 304), then processor 110a of VACS 110 connects the call locally.

When at least one of the recipients of the call request is located outside of the local area network ("No" path out of decision step 304), then processor 110a of VACS 110 requests presence information from the wide area network (step 308). Specifically, processor 110a of VACS 110 obtains the presence information from presence server 120 by way of proxy server 112 and gateway 118. When the presence information indicates that recipients of the call request that are located in the wide area network are all currently available ("Yes" path out of decision step 310), then processor 110a of VACS 110 coordinates the call with the wide area network (step 312). Specifically, VACS 110 communicates with proxy server 112, gateway 118 and call control element 122 of the wide area network to setup the call.

When at least one of the recipients that is located on the wide area network is not available ("No" path out of decision step 310), then processor 110a of VACS 110 determines whether any of the recipients located on the wide area network are available. When at least one of the recipients located on the wide area network is available ("Yes" path out of decision step 314), then processor 110a of VACS 110 coordinates the call with the wide area network (step 316). The call requestor can be notified of the call recipients that are unavailable. When none of the recipients located on the wide area network are available ("No" path out of decision step 314), then processor 110a of VACS performs unavailability procedures, which can include notifying the call requestor that none of the recipients on the wide area network are available (step 318).

The use of presence information from a wide area network as described above has a number of advantages over conventional techniques for calls between communication units supported by wide area and local area networks. For example, if a group call included at least communication unit supported by the wide area network, presence information of the wide area network was not employed, and that communication unit was not available for the call (e.g., out of coverage, powered-off, on another call), then the communication units that were available may have to wait for the voice mail recording processing of the unavailable communication unit to be completed before conducting the call. Otherwise, the unavailable communication unit's voice mail system will record a portion of the call.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of connecting a call between a local area network and a wide area network, the method comprising the acts of:
   receiving a call request by a network element of the local area network from a communication unit in the local area network;
   determining, by the network element of the local area network, that the call request includes an identification of a communication unit supported by the wide area network;
   accessing in response to the received call request, by the network element of the local area network via a proxy server of the local area network and a gateway of the wide area network, presence information for the communication unit supported by the wide area network from a network element of the wide area network; and
   establishing the call by the network element of the local area network between the communication unit supported by the local area network and the communication unit supported by the wide area network according to the presence information accessed in response to the received call request, wherein the proxy server of the local area network maps a first call control protocol of the local area network with a second call control protocol of the wide area network, and wherein the established call is a half-duplex push-to-talk call.

2. The method of claim 1, wherein the communication unit supported by the wide area network communicates in the call using Push-to-Talk over Cellular (PoC) push-to-talk technology.

3. The method of claim 1, wherein when the call request includes an identification of another communication unit supported by the wide area network, and accessed presence information indicates that the another communication unit is unavailable, a call requester is notified of the unavailability.

4. The method of claim 1, wherein when the call request includes an identification of another communication unit supported by the wide area network, and accessed presence information indicates that the another communication unit is available, the another communication unit is included in the call.

5. The method of claim 1, wherein the call request is digitized voice identifying a talk group.

6. The method of claim 1, further comprising:
determining, by the network element of the local area network, that the call request includes an identification of a communication unit supported by the wide area network, wherein the communication unit supported by the wide area network is registered with the network element of the local area network via the gateway of the wide area network and the proxy server of the local area network.

7. A communication server of a local area network, comprising:
a processor, coupled to the memory, wherein the processor includes:
logic for receiving a call request from a communication unit of the local area network;
logic for determining that the call request includes an identification of a communication unit supported by a wide area network;
logic for accessing in response to the received call request, via a proxy server of the local area network and a gateway of the wide area network, presence information for the communication unit supported by the wide area network from a network element of the wide area network; and
logic for establishing the call between the communication unit supported by the local area network and the communication unit supported by the wide area network according to the presence information accessed in response to the received call request, wherein the proxy server of the local area network maps a first call control protocol of the local area network with a second call control protocol of the wide area network; and
a coupling to the proxy server,
wherein the established call is a half-duplex push-to-talk call, and
wherein the processor is a field programmable gate array (FPGA) or application specific integrated circuit (ASIC).

8. The communication server of claim 7, wherein the communication unit supported by the wide area network communicates in the call using Push-to-Talk over Cellular (PoC) push-to-talk technology.

9. The communication server of claim 7, wherein when the call request includes an identification of another communication unit supported by the wide area network, and accessed presence information indicates that the another communication unit is unavailable, a call requester is notified of the unavailability.

10. The communication server of claim 7, wherein when the call request includes an identification of another communication unit supported by the wide area network, and accessed presence information indicates that the another communication unit is available, the another communication unit is included in the call.

11. The communication server of claim 7, wherein the call request is digitized voice identifying a talk group.

12. A communication server of a local area network, comprising:
a memory that stores processor-executable code, including:
logic for receiving a call request from a communication unit of the local area network;
logic for determining that the call request includes an identification of a communication unit supported by a wide area network;
logic for accessing in response to the received call request, via a proxy server of the local area network and a gateway of the wide area network, presence information for the communication unit supported by the wide area network from a network element of the wide area network; and
logic for establishing the call between the communication unit supported by the local area network and the communication unit supported by the wide area network according to the presence information accessed in response to the received call request, wherein the proxy server of the local area network maps a first call control protocol of the local area network with a second call control protocol of the wide area network; and
a microprocessor, coupled to the memory, that executes the code stored in the memory.

13. The communication server of claim 12, wherein the communication unit supported by the wide area network communicates in the call using Push-to-Talk over Cellular (PoC) push-to-talk technology.

14. The communication server of claim 12, wherein when the call request includes an identification of another communication unit supported by the wide area network, and accessed presence information indicates that the another communication unit is unavailable, a call requester is notified of the unavailability.

15. The communication server of claim 12, wherein when the call request includes an identification of another communication unit supported by the wide area network, and accessed presence information indicates that the another communication unit is available, the another communication unit is included in the call.

16. The communication server of claim 12, wherein the call request is digitized voice identifying a talk group.

* * * * *